(12) United States Patent
Ma et al.

(10) Patent No.: US 10,932,251 B2
(45) Date of Patent: Feb. 23, 2021

(54) DATA RECEIVING METHOD AND APPARATUS THEREOF, AND DATA SENDING METHOD AND APPARATUS THEREOF

(71) Applicant: HUAWEI TECHNOLOGIES CO., LTD., Shenzhen (CN)

(72) Inventors: Ruixiang Ma, Beijing (CN); Yongxia Lyu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/576,841

(22) Filed: Sep. 20, 2019

(65) Prior Publication Data

US 2020/0037294 A1   Jan. 30, 2020

Related U.S. Application Data

(63) Continuation of application No. PCT/CN2018/079723, filed on Mar. 21, 2018.

(30) Foreign Application Priority Data

Mar. 22, 2017   (CN) .......................... 201710175840.5

(51) Int. Cl.
   *H04W 72/04*   (2009.01)
(52) U.S. Cl.
   CPC ..... *H04W 72/042* (2013.01); *H04W 72/0446* (2013.01)
(58) Field of Classification Search
   None
   See application file for complete search history.

(56) References Cited

U.S. PATENT DOCUMENTS

| | | | |
|---|---|---|---|
| 2015/0181576 A1* | 6/2015 | Papasakellariou | H04L 1/08 370/329 |
| 2015/0195069 A1* | 7/2015 | Yi | H04W 76/27 370/329 |

(Continued)

FOREIGN PATENT DOCUMENTS

| | | |
|---|---|---|
| CN | 106301738 A | 1/2017 |
| CN | 106455103 A | 2/2017 |
| CN | 106470398 A | 3/2017 |

OTHER PUBLICATIONS

Samsung, "Multiplexing URLLC and eMBB in DL", 3GPP TSG RAN WG1 Meeting #86bis, R1-1609059, Oct. 10-14, 2016, total 6 pages, XP051159255, Lisbon, Portugal.

(Continued)

*Primary Examiner* — Anh Vu H Ly
(74) *Attorney, Agent, or Firm* — Maier & Maier, PLLC

(57) ABSTRACT

In a data sending method, a terminal device receives first control information in a first time unit. The first control information indicates a first time domain resource that is used to send a first information block. The terminal device receives the first information block on at least a part of the first time domain resource based on the first control information. The terminal device further receives second control information in a second time unit. The second control information indicates a second time domain resource that is used to send the first information block. The terminal device receives the first information block on the second time domain resource based on the second control information. The first time unit is different from the second time unit, and the first time domain resource and the second time domain resource have an overlapping time domain resource.

20 Claims, 8 Drawing Sheets

(56) References Cited

U.S. PATENT DOCUMENTS

| | | |
|---|---|---|
| 2015/0215825 A1* | 7/2015 | Kim .................. H04W 72/0413 |
| | | 370/331 |
| 2017/0214495 A1* | 7/2017 | Golitschek Edler von |
| | | Elbwart ................ H04L 1/1861 |
| 2018/0205512 A1* | 7/2018 | You .......................... H04W 4/70 |
| 2018/0219649 A1* | 8/2018 | Ying ..................... H04L 1/1816 |
| 2019/0007891 A1 | 1/2019 | Xu et al. |
| 2019/0335536 A1* | 10/2019 | Kwon ................... H04L 1/1864 |
| 2020/0092856 A1* | 3/2020 | Horiuchi ............... H04L 1/0072 |
| 2020/0100219 A1* | 3/2020 | Takeda .................. H04L 5/0048 |

OTHER PUBLICATIONS

Huawei et al., "Performance Evaluation of UL URLLC Schemes", 3GPP TSG RAN WG1 Meeting #87, R1-1611223, Nov. 14-18, 2016, total 6 pages, Reno, Nevada.

Guangdong Oppo Mobile Telecom, "Discussions on uplink grant-free transmission", 3GPP TSG RAN WG1 Meeting #88, R1-1701962, Feb. 13-17, 2017, total 6 pages, XP051209124, Athens, Greece.

Huawei et al., "DL control and data channel reliability considerations for URLLC", 3GPP TSG RAN WG1 Meeting #88, R1-1701664, Feb. 13-17, 2017, total 8 pages, XP051208831Athens, Greece.

* cited by examiner

DATA RECEIVING METHOD AND APPARATUS THEREOF, AND DATA SENDING METHOD AND APPARATUS THEREOF

CROSS-REFERENCE TO RELATED APPLICATIONS

This application is a continuation of International Application No. PCT/CN2018/079723, filed on Mar. 21, 2018, which claims priority to Chinese Patent Application No. 201710175840.5, filed on Mar. 22, 2017, the disclosures of the aforementioned applications are hereby incorporated by reference in their entireties.

TECHNICAL FIELD

The embodiments relate to the communication field, and to a data receiving method and an apparatus thereof, and a data sending method and an apparatus thereof.

BACKGROUND

Mobile communication technology has already profoundly changed lives of people. However, people still continue to pursue mobile communication technologies with higher performance. To meet requirements for a future explosive growth in mobile data traffic, device connections in massive mobile communications, and various new services and application scenarios that continuously spring up, a fifth-generation (5G) mobile communication system emerges. The 5G mobile communication system needs to support enhanced mobile broadband (eMBB) services, ultra-reliable and low-latency communications (URLLC) service, and a massive machine-type communications (mMTC) services.

Typical URLLC services include wireless control in an industrial manufacturing or production procedure, motion control in an unmanned vehicle or an unmanned plane, a haptic interaction application in a remote surgery, and the like. Main features of these services include ultra-reliability, low latency, relatively small amount of transmitted data, and burstiness.

The URLLC service has an extremely high requirement in latency. When reliability is not considered, a transmission latency needs to fall within 0.5 millisecond (ms). When reliability reaches 99.999%, a transmission latency needs to fall within 1 ms.

Therefore, a data sending method and a data receiving method are needed to meet service requirements for high reliability and a low latency.

SUMMARY

Exemplary embodiments described herein provide a data receiving method and an apparatus thereof, and a data sending method and an apparatus thereof, to meet service requirements for high reliability and a low latency.

According to a first aspect, a data receiving method is provided, including: receiving, by a terminal device, first control information in a first time unit, where the first control information indicates a first time domain resource that is used to send a first information block; receiving, by the terminal device, the first information block on at least a part of the first time domain resource based on the first control information; receiving, by the terminal device, second control information in a second time unit, where the second control information indicates a second time domain resource that is used to send the first information block; and receiving, by the terminal device, the first information block on the second time domain resource based on the second control information, where the first time unit is different from the second time unit, and the first time domain resource and the second time domain resource have an overlapping time domain resource.

Thus, in exemplary embodiments, if the first control information is lost, the terminal device can still receive, based on the received second control information, the first information block sent by a network device on the overlapping time domain resource. Therefore, according to the method provided in this embodiment, service transmission reliability can be improved.

With reference to the first aspect, in a first possible implementation of the first aspect, the second time domain resource is a proper subset of the first time domain resource.

Therefore, an overlapping part of the second time domain resource and the first time domain resource in time domain is actually the second time domain resource.

With reference to the first aspect and the foregoing implementation, in a second possible implementation of the first aspect, the first time domain resource is a subset of the second time domain resource.

Thus, the first time domain resource may completely overlap with the second time domain resource in time domain, or the first time domain resource may be a proper subset of the second time domain resource.

With reference to the first aspect and the foregoing implementations, in a third possible implementation of the first aspect, the first information block is transmitted a total of N times, the first control information indicates the terminal device to receive the first information block in the first time unit at an $S^{th}$ time; and/or the second control information indicates the terminal device to receive the first information block in the second time unit at an $L^{th}$ time, where $1 \leq S \leq N$, $1 \leq L \leq N$, and S, L, and N are integers.

With reference to the first aspect and the foregoing implementations, in a fourth possible implementation of the first aspect, the first control information indicates that the first information block is transmitted a total of P times; and/or the second control information indicates that the first information block is transmitted a total of Q times, where $1 \leq P \leq N$, $1 \leq Q \leq N$, and P, Q, and N are integers.

Optionally, in an embodiment, the first control information indicates that a redundancy version (RV) is used for the first information block received on the first time domain resource.

Optionally, in an embodiment, the second control information indicates that an RV is used for the first information block received on the second time domain resource.

Optionally, in an embodiment, the first control information indicates that an MCS is used for the first information block received on the first time domain resource.

Optionally, in an embodiment, the second control information indicates that an MCS is used for the first information block received on the second time domain resource.

Optionally, in an embodiment, the method includes: sending, by the network device, the first control information to the terminal device, where the first control information indicates the terminal device to separately receive the first information block in N time units, and N is a positive integer.

Optionally, in an embodiment, the method includes: sending, by the network device, an $i^{th}$ piece of control information in N pieces of control information to the terminal device, where the $i^{th}$ piece of control information indicates the terminal device to receive the first information block in i time units, N is a positive integer, $1 \leq i \leq N$, and N is a positive integer.

Optionally, in an embodiment, the method includes: sending, by the network device, an $i^{th}$ piece of control information in M pieces of control information to the terminal device, where the $i^{th}$ piece of control information indicates the terminal device to receive the first information block on the first time-frequency resource in k time units; and sending, by the network device, a $j^{th}$ piece of control information in the M pieces of control information to the terminal device, where the $j^{th}$ piece of control information indicates the terminal device to receive the first information block on the second time-frequency resource in the k time units, a $k^{th}$ time unit includes the first time-frequency resource and the second time-frequency resource, M is a positive integer, where $1 \leq i \leq j \leq k \leq M$, and M is a positive integer.

According to a second aspect, a data sending method is provided, including: sending, by a network device, first control information to the terminal device in a first time unit, where the first control information indicates a first time domain resource that is used to send a first information block; sending the first information block to the terminal device on at least a part of the first time domain resource; sending, by the network device, second control information to the terminal device in a second time unit, where the second control information indicates a second time domain resource that is used to send the first information block; and sending, by the network device, the second information block to the terminal device on the second time domain resource, where the first time unit is different from the second time unit, and the first time domain resource and the second time domain resource have an overlapping time domain resource.

With reference to the second aspect, in a first possible implementation of the second aspect, the second time domain resource is a proper subset of the first time domain resource.

With reference to the second aspect and the foregoing implementation, in a second possible implementation of the second aspect, the first time domain resource is a subset of the second time domain resource.

With reference to the second aspect and the foregoing implementations, in a third possible implementation of the second aspect, the first information block is transmitted a total of N times, the first control information indicates the terminal device to receive the first information block in the first time unit at an $S^{th}$ time; and/or the second control information indicates the terminal device to receive the first information block in the second time unit at an $L^{th}$ time, where $1 \leq S \leq N$, $1 \leq L \leq N$, and S, L, and N are integers.

With reference to the second aspect and the foregoing implementations, in a fourth possible implementation of the second aspect, the first control information indicates that the first information block is transmitted a total of P times; and/or the second control information indicates that the first information block is transmitted a total of Q times, $1 \leq P \leq N$, $1 \leq Q \leq N$, and P, Q, and N are integers.

According to a third aspect, a terminal device is provided, configured to perform the foregoing method performed by the terminal device. The terminal device may include modules, for example, a processing module, a sending module, and a receiving module, configured to perform corresponding steps of the terminal device.

According to a fourth aspect, a network device is provided, configured to perform the foregoing method. The network device may include modules, for example, a processing module, a sending module, and a receiving module, configured to perform corresponding steps of the network device.

According to a fifth aspect, a terminal device is provided, including a memory and a processor. The memory is configured to store a computer program. The processor is configured to call the computer program from the memory and run the computer program, so that the terminal device performs the foregoing method performed by the terminal device.

According to a sixth aspect, a network device is provided, including a memory and a processor. The memory is configured to store a computer program. The processor is configured to call the computer program from the memory and run the computer program, so that the network device performs the foregoing method performed by the network device.

According to a seventh aspect, a computer-readable storage medium is provided. The computer-readable storage medium stores an instruction. When the instruction is run on a computer, the computer is enabled to perform the method according to the foregoing aspects.

According to an eighth aspect, a computer program product including an instruction is provided. When the computer program product is run on a computer, the computer is enabled to perform the method according to the foregoing aspects.

Therefore, according to the methods provided in the embodiments, service transmission reliability can be improved.

DESCRIPTION OF EMBODIMENTS

Figure 1:
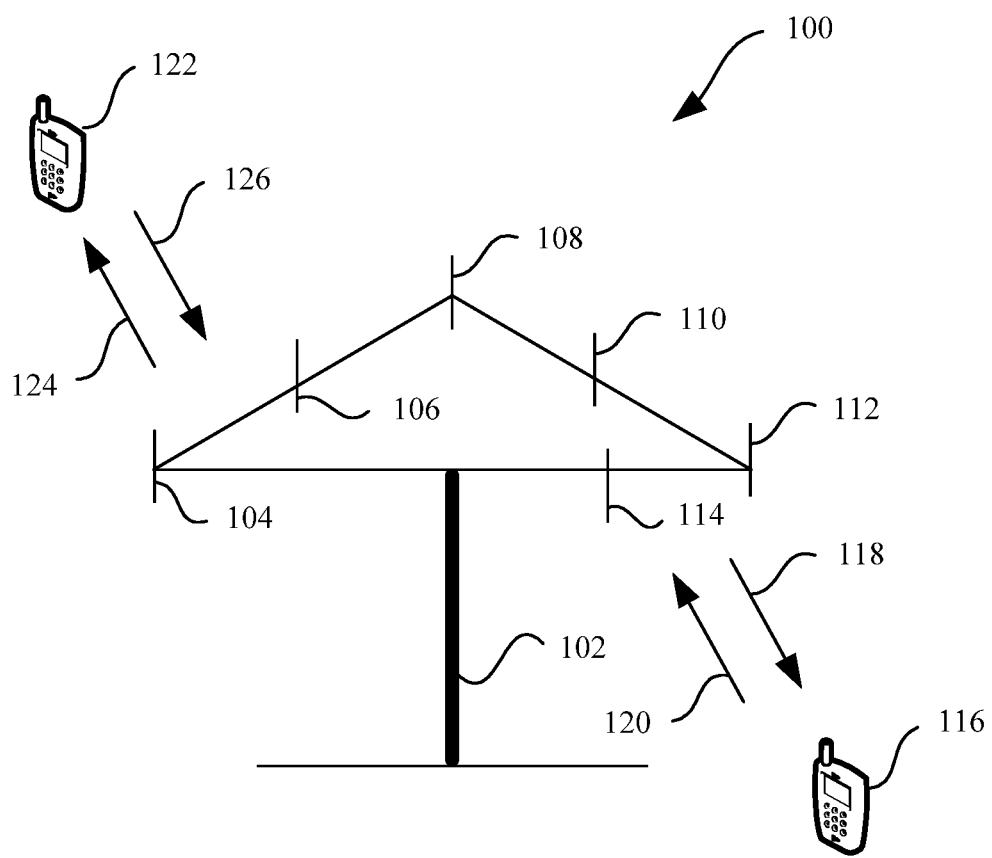
FIG. 1 is a schematic diagram of a wireless communication system applied to an embodiment.

It should be understood that the embodiments may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, a long term evolution advanced (LTE-A) system, a universal mobile telecommunication system (UMTS), or a next-generation communication system such as a 5G system.

A quantity of connections supported by a conventional communication system is usually limited, and is easily implemented. However, with development of a communication technology, a mobile communication system not only supports conventional communication, but also supports, for example, device-to-device (D2D) communication, machine-to-machine (M2M) communication, machine type communication (MTC), and vehicle to vehicle (V2V) communication.

Exemplary embodiments are described in combination with a sending device and a receiving device. The sending device may be one party of a network device and a terminal device, and the receiving device may be the other party of the network device and the terminal device. For example, in the embodiments, the sending device may be the network device, and the receiving device may be the terminal device; or the sending device may be the terminal device, and the receiving device may be the network device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a next-generation communication system such as a terminal device in a fifth-generation (5G) communication network or a terminal device in a future evolved public land mobile network (PLMN) network.

In an exemplary embodiment, the terminal device may alternatively be a wearable device. The wearable device may also be referred to as an intelligent wearable device, and is a collective term of a wearable device that is intelligently developed and designed from everyday wearable things, for example, glasses, gloves, a watch, clothes, and shoes, by applying a wearable technology. The wearable device is a portable device that is directly worn or is integrated into clothes or accessories of a user. The wearable device is not only a hardware device, but is also used to implement a powerful function through software support, data exchange, and cloud interaction. In a broad sense, the intelligent wearable device includes a device, for example, a smartwatch or smart glasses, that has a full function and a large size and that can implement all or some functions without depending on a smartphone, and a device, for example, various smart bands and smart accessories for performing vital sign monitoring, that is dedicated to a type of application function and that needs to be cooperated with another device such as a smartphone.

The network device may be a device configured to communicate with a mobile device. The network device may be an access point (AP) in a WLAN or a base transceiver station (BTS) in GSM or CDMA, or may be a NodeB (NB) in WCDMA, or may be an evolved NodeB (eNB or eNodeB) in LTE, a relay station, an access point, a vehicle-mounted device, a wearable device, a network device in a future 5G network, a network device in a future evolved PLMN network, or the like.

In addition, in the embodiments, the network device serves a cell, and the terminal device communicates with the network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have features of a small coverage area and low transmit power, and are suitable for providing a high-rate data transmission service.

A method and an apparatus provided in the embodiments may be applied to a terminal device or a network device. The terminal device or the network device includes a hardware layer, an operating system layer that runs on the hardware layer, and an application layer that runs on the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, implementing service processing by using a process. The application layer includes applications such as a browser, an address book, word processing software, and instant messaging software. In addition, in the embodiments, a specific structure of an execution body for performing a signal transmission method is not particularly limited, provided that communication can be performed according to the signal transmission method by running a program of code that records the signal transmission method. For example, a wireless communication method may be performed by a terminal device, a network device, or a function module that is in the terminal device or the network device and that can call a program and execute the program.

In addition, aspects or features in the embodiments may be implemented as a method, an apparatus, or a product that uses standard programming and/or engineering technologies. The term "product" covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a memory stick, or a key drive). In addition, various storage media may represent one or more devices and/or other machine-readable media that are configured to store information. The term "machine-readable media" may include but is not limited to a radio channel and various other media that can store, contain, and/or carry an instruction and/or data.

To meet requirements for a future explosive growth in mobile data traffic, device connections in massive mobile communication, and various new services and application scenarios that continuously spring up, how to improve reliability and reduce a latency of a service is an urgent problem to be resolved currently.

For the foregoing problem, the embodiments provide a data sending method, a data receiving method, a corresponding network device, and a corresponding terminal device.

The following describes the technical solutions with reference to the accompanying drawings.

FIG. 1 is a schematic diagram of a wireless communication system applied to an embodiment. As shown in FIG. 1, the wireless communication system 100 includes a network device 102. The network device 102 may include one antenna or a number of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a number of components (for example, a processor, a modulator, a multiplexer, a demodulator, a demultiplexer, or an antenna) related to signal sending and receiving.

The network device 102 may communicate with a number of terminal devices (for example, a terminal device 116 and a terminal device 122). However, it may be understood that the network device 102 may communicate with any quantity of terminal devices similar to the terminal device 116 or the terminal device 122. The terminal devices 116 and 122 may be, for example, cellular phones, smartphones, portable computers, handheld communication devices, handheld computing devices, satellite radio apparatuses, global positioning systems, PDAs, and/or any other appropriate devices configured to perform communication in the wireless communication system 100.

As shown in FIG. 1, the terminal device 116 communicates with the antennas 112 and 114. The antennas 112 and 114 send information to the terminal device 116 through a forward link (also referred to as a downlink) 118 and receive information from the terminal device 116 through a reverse link (also referred to as an uplink) 120. In addition, the terminal device 122 communicates with the antennas 104 and 106. The antennas 104 and 106 send information to the terminal device 122 through a forward link 124 and receive information from the terminal device 122 through a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system, a full duplex system, and a flexible duplex system, the forward link 118 and the reverse link 120 may use the same frequency band, and the forward link 124 and the reverse link 126 may use the same frequency band.

Each antenna (or antenna group including a number of antennas) and/or an area that are/is designed for communication is referred to as a sector of the network device 102. For example, an antenna group may be designed to communicate with a terminal device in a sector of a coverage area of the network device 102. The network device may send, by using a single-antenna or multi-antenna transmit diversity, a signal to all terminal devices in the sector corresponding to the network device. When the network device 102 communicates with the terminal devices 116 and 122 respectively by using the forward links 118 and 124, a transmit antenna of the network device 102 may also increase signal-to-noise ratios of the forward links 118 and 124 through beamforming. In addition, compared with the manner in which the network device sends, by using the single-antenna or multi-antenna transmit diversity, the signal to all terminal devices served by the network device, when the network device 102 sends, through beamforming, a signal to the terminal devices 116 and 122 that are randomly scattered in the related coverage area, less interference is caused to a mobile device in a neighboring cell.

The network device 102, the terminal device 116, or the terminal device 122 may be a wireless communication sending apparatus and/or a wireless communication receiving apparatus. When sending data, the wireless communication sending apparatus may encode the data for transmission. The wireless communication sending apparatus may obtain (for example, generate, receive from another communication apparatus, or store in a memory) a particular quantity of data bits that need to be sent to the wireless communication receiving apparatus through a channel. The data bits may be included in a transport block (or a number of transport blocks) of data, and the transport block may be segmented to generate a number of code blocks.

In addition, the communication system 100 may be a PLMN network, a D2D network, an M2M network, or another network. FIG. 1 is merely a simplified exemplary schematic diagram. The network may further include another network device, which is not shown in FIG. 1.

Figure 2:
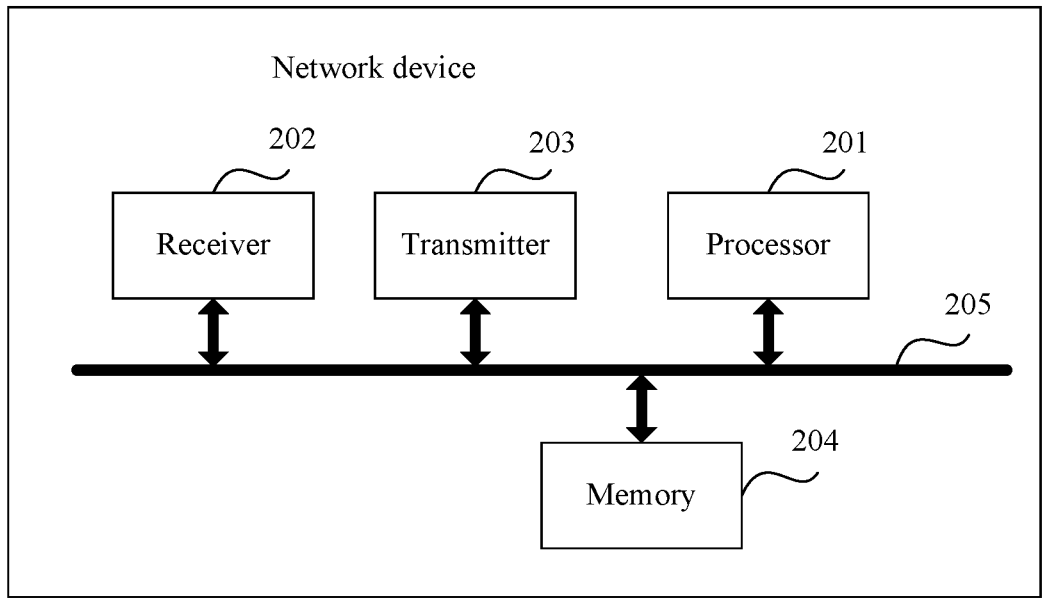
FIG. 2 is a schematic structural diagram of a network device in the wireless communication system shown in FIG. 1.

FIG. 2 is a schematic structural diagram of a network device in the foregoing wireless communication system. The network device can perform the data sending method provided in the embodiments. The network device includes a processor 201, a receiver 202, a transmitter 203, and a memory 204. The processor 201 may be connected to and communicate with the receiver 202 and the transmitter 203. The memory 204 may be configured to store program code and data of the network device. Therefore, the memory 204 may be a storage unit inside the processor 201, may be an external storage unit independent from the processor 201, or may be a component including the storage unit inside the processor 201 and the external storage unit independent from the processor 201.

Optionally, the network device may further include a bus 205. The receiver 202, the transmitter 203, and the memory 204 may be connected to the processor 201 by using the bus 205. The bus 205 may be a peripheral component interconnect (PCI) bus, an extended industry standard architecture (EISA) bus, or the like. The bus 205 may be classified into an address bus, a data bus, a control bus, and the like. For ease of representation, only one bold line is used to represent the bus in FIG. 2, but this does not mean that there is only one bus or only one type of bus.

The processor 201 may be, for example, a CPU, a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logic blocks, modules, and circuits described with reference to content disclosed herein. Alternatively, the processor may be a combination of processors implementing a computing function, for example, a combination of one or more microprocessors, or a combination of the DSP and a microprocessor.

The receiver 202 and the transmitter 203 may be circuits including the foregoing antenna, transmitter chain, and receiver chain. The receiver 202 and the transmitter 203 may be independent circuits or may be the same circuit.

Figure 3:
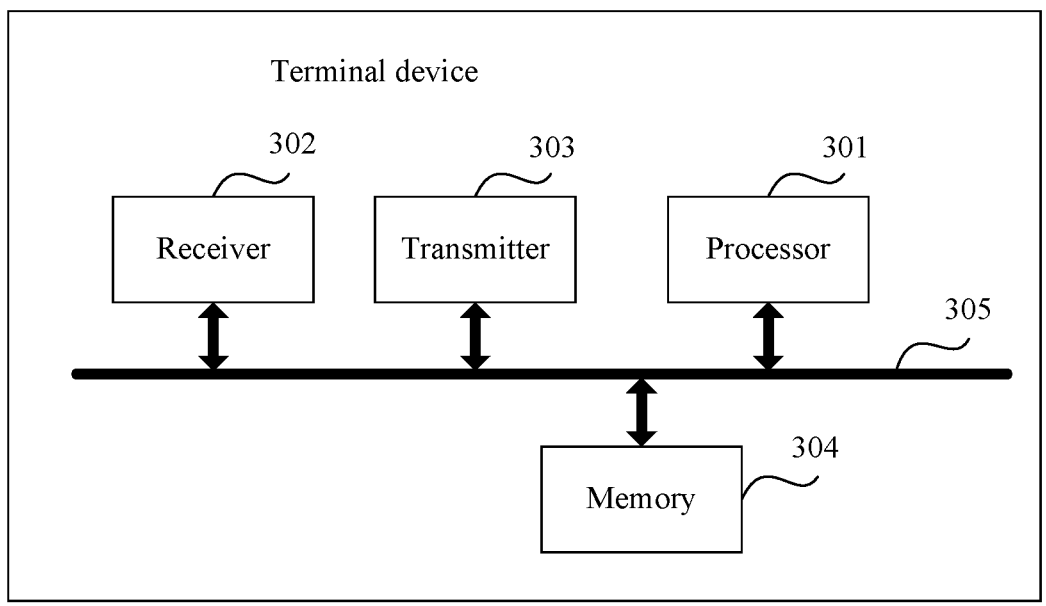
FIG. 3 is a schematic structural diagram of a terminal device in the wireless communication system shown in FIG. 1.

FIG. 3 is a schematic structural diagram of a terminal device in the foregoing wireless communication system. The terminal device can perform the data receiving method provided in the embodiments. The terminal device may include a processor 301, a receiver 302, a transmitter 303, and a memory 304. Optionally, the processor 301 may be connected to and communicate with the receiver 302 and the transmitter 303. Alternatively, the terminal device may further include a bus 305. The receiver 302, the transmitter 303, and the memory 304 may be connected to the processor 301 by using the bus 305. The bus 305 may be a PCI bus, an EISA bus, or the like. The bus 305 may be classified into an address bus, a data bus, a control bus, and the like. For ease of representation, only one bold line is used to represent the bus in FIG. 3, but this does not mean that there is only one bus or only one type of bus.

Correspondingly, the memory 304 may be configured to store program code and data of the terminal device. Therefore, the memory 304 may be a storage unit inside the processor 301, may be an external storage unit independent from the processor 301, or may be a component including the storage unit inside the processor 301 and the external storage unit independent from the processor 301. The receiver 302 and the transmitter 303 may be independent circuits or may be the same circuit.

In this embodiment, an information block may be a transport block, a code block, or a code block group. The code block includes a group of information bits, and the group of information bits are used together to perform channel encoding once, or the group of information bits are used together by a sending device to perform channel encoding, and correspond to one bit block obtained after the channel encoding. The code block group includes at least one code block and may include a number of code blocks. The transport block includes at least one code block or may include at least one code block group. This is not limited in this embodiment.

In this embodiment, a time-frequency resource includes one or more time units in the time domain. Each time unit may include one or more time domain symbols, one or more slots, one or more mini-slots, or one or more subframes. If a first time-frequency resource includes a number of time units, time units may be continuous, or may be discrete. This is not limited in this embodiment. The time domain symbol may be an orthogonal frequency division multiplexing (OFDM) symbol or may be a single-carrier frequency-division multiplexing (SC-FDM) symbol.

In this embodiment, the time-frequency resource occupies a bandwidth in frequency domain. The bandwidth may be one or more physical resource blocks (PRB), one or more physical resource block groups (PRBG), or may be one or more subbands. When the first time-frequency resource includes a number of time domain units, sizes and locations of frequency domain resources in all the time domain units may be the same, or may be different. For example, the network device may schedule downlink transmission of the terminal device by using a method in which frequency domain resource hopping is performed in different time domain units.

Figure 4:
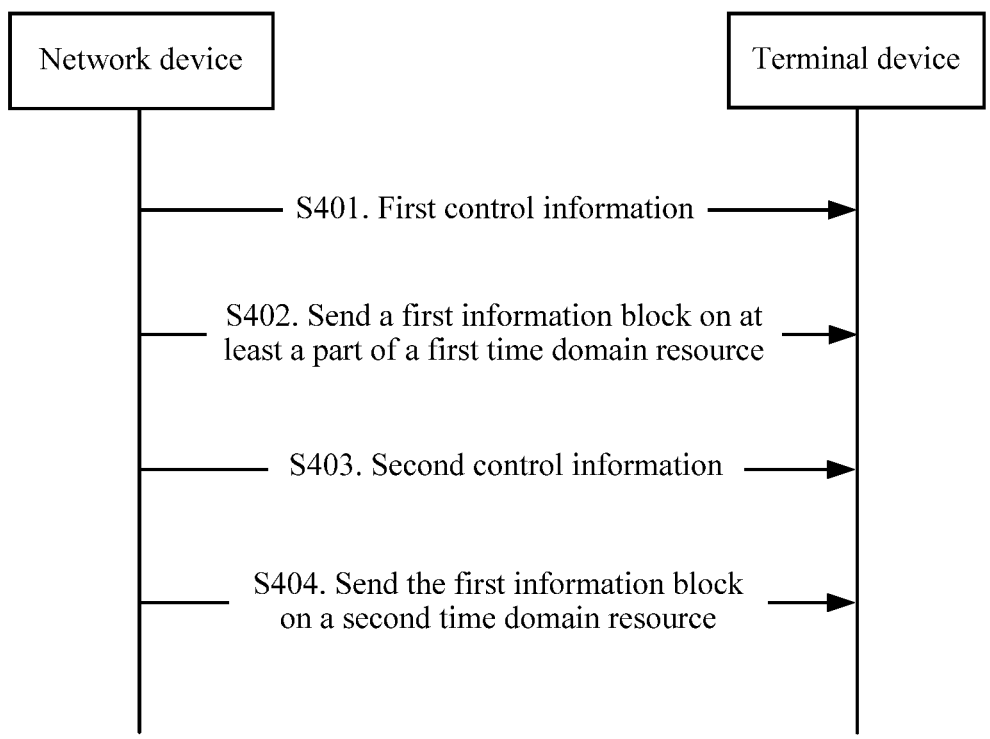
FIG. 4 is an interactive diagram of data transmission in a method according to an embodiment.

The following describes the method in the embodiments. FIG. 4 is an interactive diagram of data transmission in a method according to an embodiment. As shown in FIG. 4, the method includes the following steps.

In step 401, a network device sends first control information to a terminal device in a first time unit, and the terminal device receives the first control information in the first time unit, where the first control information indicates a first time domain resource that is used to send a first information block.

The first control information may be carried on a first control channel. In other words, the network device sends the first control information to the terminal device by using the first control channel.

The first control channel may be a physical downlink control channel (PDCCH) or another downlink channel used to carry physical layer control information, and the first control information may be first downlink control information (DCI). This is not limited in this embodiment.

The first control information is used to schedule transmission of the first information block on the first time-frequency resource. The terminal device can receive the first information block on the first time-frequency resource based on the first control information. The first control information includes at least: transmission resource indication information of the first information block on the first time-frequency resource, a hybrid automatic repeat request (HARQ) process identifier index of the first information block on the first time-frequency resource, HARQ feedback resource indication information of the first information block on the first time-frequency resource, MCS information of the first information block on the first time-frequency resource group, precoding information of the first information block on the first time-frequency resource, redundancy version information of the first information block on the first time-frequency resource, information that is about the first information block on the first time-frequency resource and that indicates whether data is newly-transmitted, and the like. This is not limited in this embodiment.

Therefore, the first control information is used to schedule one or more times of transmission of the first information block on the first time domain resource.

In step 402, the network device sends the first information block to the terminal device on at least a part of the first time domain resource, and correspondingly, the terminal device receives, based on the first control information received in step 401, the first information block sent by the network device on the part of the first time domain resource.

In step 403, the network device sends second control information to the terminal device in a second time unit, and the terminal device receives the second control information in the second time unit, where the second control information indicates a second time domain resource that is used to send the first information block.

The second control information may be carried on a second control channel. In other words, the network device sends the second control information to the terminal device by using the second control channel.

It should be understood that the first time unit is different from the second time unit, and the first time domain resource and the second time domain resource include a third time domain resource. Thus, the first time domain resource and the second time domain resource include an overlapping time domain resource, or the first time domain resource and the second time domain resource have the same time domain resource. The overlapping time domain resource of the first time domain resource and the second time domain resource is the third time domain resource.

In an LTE system, each PDCCH uses one or more control channel elements (CCE) for transmission. A quantity of CCEs used by one PDCCH is referred to as a CCE aggregation level. For example, a CCE aggregation level n may be 1, 2, 4, or 8. In a subframe, different PDCCHs may use different CCE aggregation levels n, and one CCE usually includes 36 resource elements. Therefore, it should be understood that, in this embodiment, the first control channel and the second control channel may use the same aggregation level, or may use different aggregation levels. This is not limited in this embodiment.

In step 404, the network device sends the first information block to the terminal device on the second time domain resource, and the terminal device receives the first information block on the second time domain resource based on the second control information.

Thus, if the first control information is lost, the terminal device can still receive, based on the received second control information, the first information block sent by the network device on the third time domain resource. Therefore, according to the method provided in this embodiment, service transmission reliability can be improved.

Figure 5:
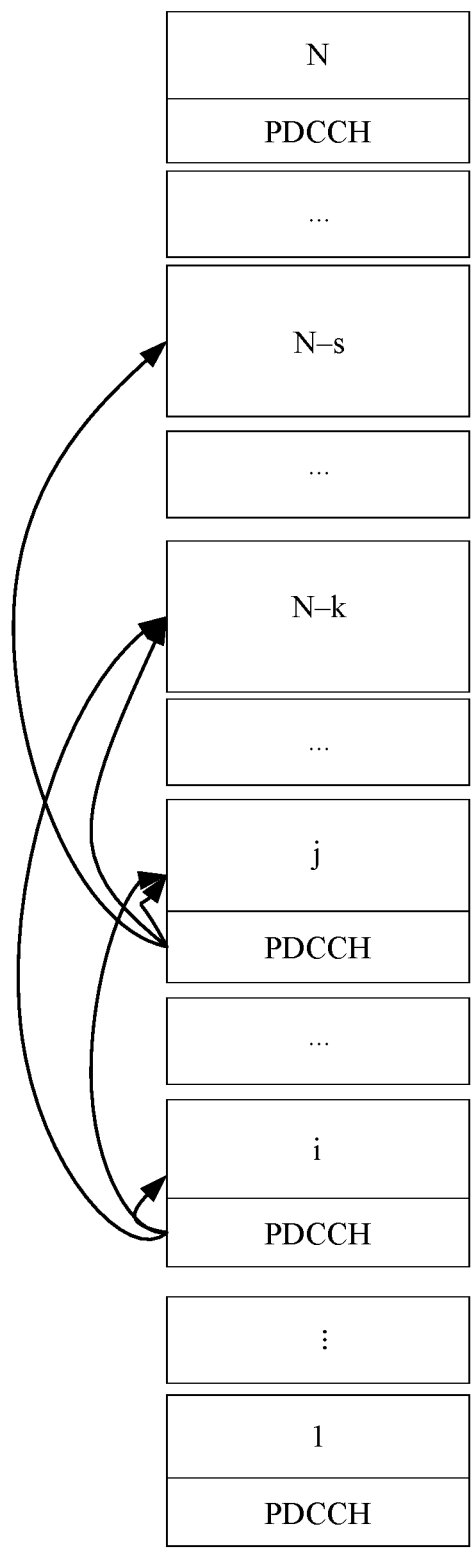
FIG. 5 is a schematic diagram of a method according to an embodiment.

The following describes the method in the embodiments with reference to an example. FIG. 5 is a schematic diagram of a method according to an embodiment.

As shown in FIG. 5, a network device needs to schedule N transmissions of a first information block in N time units. The network device sends a first PDCCH in an $i^{th}$ time unit, where the first PDCCH is used to initiate transmission of the first information block on a first time domain resource, and the first time domain resource includes the $i^{th}$ to an $(N-k)^{th}$ time units. The network device sends a second PDCCH in a $j^{th}$ time unit, where the second PDCCH is used to initiate transmission of the first information block on a second time domain resource, and the second time domain resource includes the $j^{th}$ to an $(N-s)^{th}$ time units. Further, the first time domain resource and the second time domain resource have an overlapping time domain resource part, and the overlapping time domain resource part includes the $j^{th}$ to the $(N-k)^{th}$ time units, where $1 \leq i \leq j \leq k \leq s \leq N$, and i, j, s, and k are integers.

It should be understood that the network device sends M PDCCHs to a terminal device, where $1 \leq M \leq N$. The M PDCCHs may be separately carried in M of the N time units shown in FIG. 5. This is not limited in this embodiment.

The terminal device receives the first PDCCH in the $i^{th}$ time unit, and then receives the first information block located in the $i^{th}$ to a $(j-1)^{th}$ time units based on the first PDCCH, where the $i^{th}$ to the $(j-1)^{th}$ time units are time domain resources other than the foregoing overlapping time domain resource in the first time domain resource; and the terminal device receives the second PDCCH in the $j^{th}$ time unit, and then receives the first information block on the second time domain resource based on the second PDCCH, and so on. If the terminal device does not receive a PDCCH in a time unit, the terminal device receives the first information block based on a latest received PDCCH before the time unit. In other words, the terminal device always receives an information block based on a latest received PDCCH.

Optionally, in an embodiment, the second time domain resource is a proper subset of the first time domain resource. Therefore, an overlapping part of the second time domain resource and the first time domain resource in time domain is actually the second time domain resource.

Figure 6:
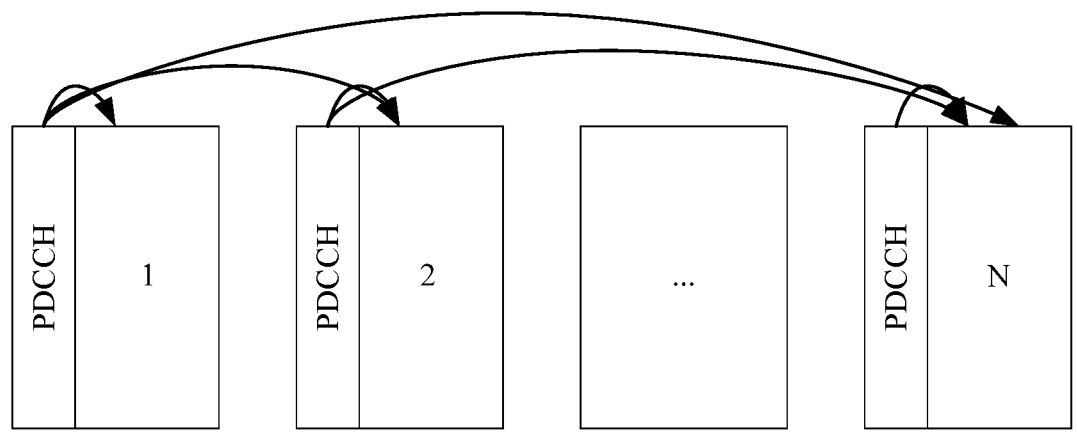
FIG. 6 is a schematic diagram of a method according to an embodiment.

The following describes the method in the embodiments with reference to an example. FIG. 6 is a schematic diagram of a method according to an embodiment.

As shown in FIG. 6, a network device sends M PDCCHs to a terminal device. For example, a first PDCCH is located in a first time unit, the first PDCCH is used to initiate transmission of a first information block on a first time domain resource, and the first time domain resource includes the first to an $N^{th}$ time units. A second PDCCH is located in a second time unit, the second PDCCH is used to initiate transmission of the first information block on a second time domain resource, and the second time domain resource includes the second to the $N^{th}$ time units, where $1 < M \leq N$.

Correspondingly, the terminal device receives the first PDCCH in the first time unit, and receives, based on the first PDCCH, the first information block carried on the first time domain resource; and the terminal device receives the second PDCCH in the second time unit, and receives, based on the second PDCCH, the first information block carried on the second time domain resource, and so on.

During communication, the network device sends the M PDCCHs to the terminal device. An $i^{th}$ PDCCH in the M PDCCHs schedules transmission of the first information block in an $i^{th}$ time unit and in subsequent $(i+1)^{th}$ to $N^{th}$ time units. Therefore, even if one or more PDCCHs are lost, the network device may still receive the first information block in the $i^{th}$ to the $N^{th}$ time units based on another PDCCH.

It should be understood that M may or may not be equal to N. When M is less than N, the quantity of PDCCHs sent by the network device is decreased, thereby reducing network overheads.

Optionally, in an embodiment, the first time domain resource is a subset of the second time domain resource.

In other words, the first time domain resource may completely overlap with the second time domain resource in time domain, or the first time domain resource may be a proper subset of the second time domain resource.

Therefore, second control information can be used not only to schedule transmission of the first information block after the second time unit, but also used to schedule transmission of the first information block before the second time unit in time domain.

It should be understood that the second control information may also be used to schedule transmission of the first information block on a time domain resource before or after the second time unit in time domain. This is not limited in this embodiment.

Figure 7:
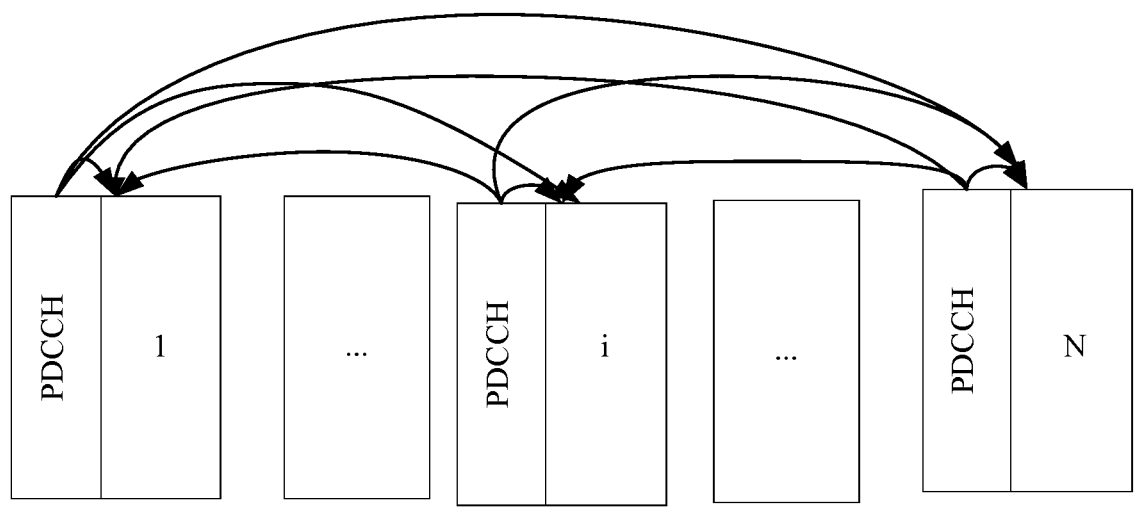
FIG. 7 is a schematic diagram of a method according to an embodiment.

The following describes the method in the embodiments with reference to an example. FIG. 7 is a schematic diagram of a method according to an embodiment.

As shown in FIG. 7, a network device sends M PDCCHs to a terminal device. For example, a first PDCCH is located in a first time unit, the first PDCCH is used to initiate transmission of a first information block on a first time domain resource, and the first time domain resource includes the first to the $N^{th}$ time units. A second PDCCH is located in an $i^{th}$ time unit, the second PDCCH is used to initiate transmission of the first information block on a second time domain resource, and the second time domain resource includes the $i^{th}$ to the $N^{th}$ time units. An overlapping time domain resource also includes the $i^{th}$ to the $N^{th}$ time units, where $1 < M \leq N$.

Correspondingly, the terminal device receives the first PDCCH in the first time unit, and receives, based on the first PDCCH, the first information block located on the first time domain resource. The terminal device receives the second PDCCH in a second time unit, receives the first information block on the second time domain resource based on the second PDCCH, and decodes the first information block on the first time-frequency resource based on the second PDCCH, and so on.

During communication, the network device sends the M PDCCHs to the terminal device. An $i^{th}$ PDCCH in the M PDCCHs can not only schedule transmission of the first information block in the $i^{th}$ time unit and in subsequent $(i+1)^{th}$ to $N^{th}$ time units, but also schedule transmission of the first information block in the first to an $(i-1)^{th}$ time units. Therefore, even if one or more PDCCHs are lost, the network device may still receive the first information block in the $i^{th}$ to the $N^{th}$ time units based on another PDCCH.

It should be understood that M may be equal to N, or may not be equal to N. When M is less than N, the quantity of PDCCHs sent by the network device is decreased, thereby reducing network overheads.

Optionally, in an embodiment, the first information block is transmitted a total of N times, and the first control information indicates that the terminal device is to receive the first information block in the first time unit at an $S^{th}$ time; and/or the second control information indicates that the terminal device is to receive the first information block in the second time unit at an $L^{th}$ time, $1 \leq S \leq N$, $1 \leq L \leq N$, and S, L, and N are integers.

In other words, the first control information may indicate in which transmission of the N transmissions the first information block in the first time unit is received, and the second control information may indicate in which transmission of the N transmissions the first information block in the second time unit is received.

Optionally, in an embodiment, the first control information indicates that the first information block is transmitted a total of P times; and/or the second control information indicates that the first information block is transmitted a total of Q times, where $1 \leq P \leq N$, $1 \leq Q \leq N$, and P, Q, and N are integers.

In other words, the first control information may include a total quantity of transmissions of the first information block scheduled by using the first control information, and the second control information may include a total quantity of transmissions of the first information block scheduled by using the second control information.

Optionally, in an embodiment, the first control information indicates an RV is used for the first information block received on the first time domain resource.

Optionally, in an embodiment, the second control information indicates an RV is used for the first information block received on the second time domain resource.

Optionally, in an embodiment, the first control information indicates an MCS is used for the first information block received on the first time domain resource.

Optionally, in an embodiment, the second control information indicates an MCS is used for the first information block received on the second time domain resource.

It should be further understood that FIG. 4 is a schematic flowchart of the method of an exemplary embodiment. It should be understood that FIG. 4 shows detailed communication steps or operations of the method. However, these steps or operations are merely exemplary, and in this embodiment, other operations or variants of the operations in FIG. 4 may be further performed. In addition, the steps in FIG. 4 may be performed based on a sequence different from that presented in FIG. 4, and not all operations in FIG. 4 may be performed.

It should be further understood that, in the embodiments, "first", "second", and "third" are merely used to differentiate between different objects, for example, differentiate between different control information and different time-frequency resources, and should not be construed as any limitation.

It should be understood that sequence numbers of the foregoing processes do not mean execution sequences in this embodiment. The execution sequences of the processes should be determined based on functions and internal logic of the processes, and should not be construed as any limitation on the implementation processes of this embodiment.

Optionally, in an embodiment, the method includes: sending, by the network device, the first control information to the terminal device, where the first control information indicates the terminal device to separately receive the first information block in N time units, where N is a positive integer.

Figure 8:
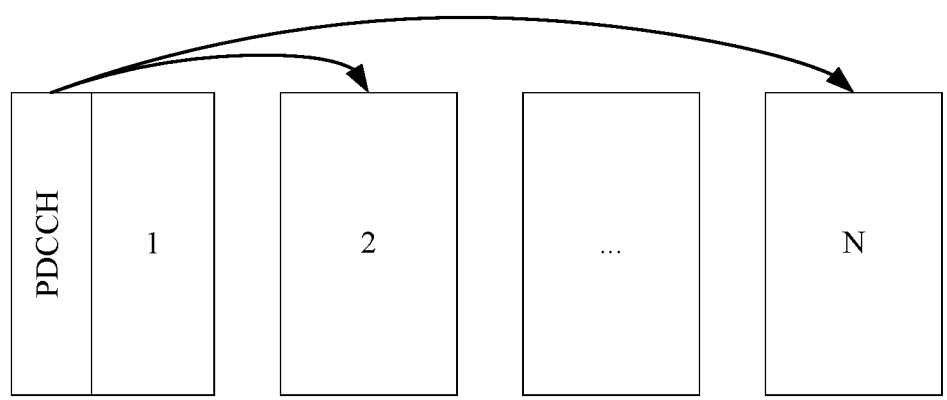
FIG. 8 is a schematic diagram of a method according to an embodiment.

As shown in FIG. 8, the network device sends one PDCCH to the terminal device. For example, a first PDCCH is located in a first time unit, the first PDCCH is used to initiate transmission of the first information block on the first time domain resource, and the first time domain resource includes the first to the $N^{th}$ time units.

Correspondingly, the terminal device receives the first PDCCH in the first time unit, and receives, based on the first PDCCH, the first information block located on the first time domain resource.

During communication, the network device sends one PDCCH to the terminal device. The PDCCH can be used to schedule N transmissions of the first information block in the first to the $N^{th}$ time units.

Optionally, in an embodiment, the method includes: sending, by the network device, an $i^{th}$ piece of control information in N pieces of control information to the terminal device, where the $i^{th}$ piece of control information indicates the terminal device to receive the first information block in i time units, N is a positive integer, $1 \leq i \leq N$, and N is a positive integer.

Figure 9:
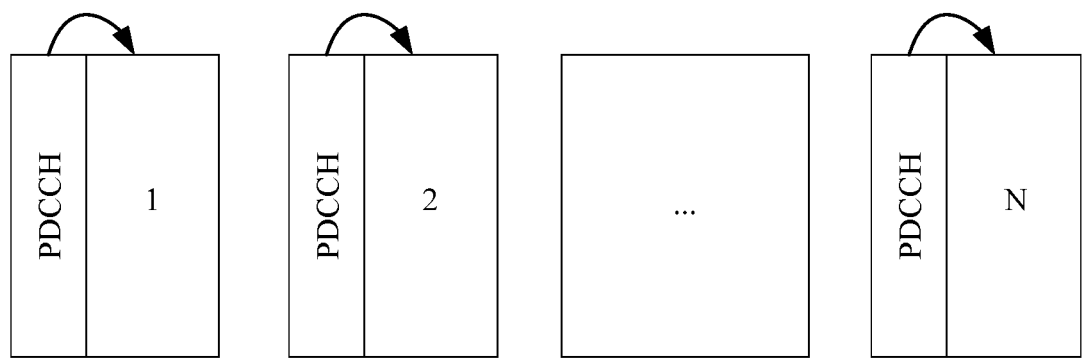
FIG. 9 is a schematic diagram of a method according to an embodiment.

As shown in FIG. 9, the network device sends N PDCCHs to the terminal device. For example, a first PDCCH is located in a first time unit, the first PDCCH is used to initiate transmission of the first information block on the first time domain resource, and the first time domain resource includes the first time unit. A second PDCCH is located in a second time unit, the second PDCCH is used to initiate transmission of the first information block on the second time domain resource, and the second time domain resource includes the first time unit. In other words, an $i^{th}$ PDCCH in the N PDCCHs is used to schedule transmission of the first information block in an $i^{th}$ time unit.

Correspondingly, the terminal device receives the $i^{th}$ PDCCH in the $i^{th}$ time unit, and receives the first information block in the $i^{th}$ time unit based on the $i^{th}$ PDCCH.

Transmission of the first information block in each time unit corresponds to one PDCCH. Therefore, even if one or more PDCCHs are lost, it is not affected by another PDCCH which indicates the terminal device to receive corresponding data information.

Optionally, in an embodiment, the method includes: sending, by the network device, an $i^{th}$ piece of control information in M pieces of control information to the terminal device, where the $i^{th}$ piece of control information indicates the terminal device to receive the first information block on the first time-frequency resource in k time units; and sending, by the network device, a $j^{th}$ piece of control information in the M pieces of control information to the terminal device, where the $j^{th}$ piece of control information indicates the terminal device to receive the first information block on the second time-frequency resource in the k time units, a $k^{th}$ time unit includes the first time-frequency resource and the second time-frequency resource, M is a positive integer, $1 \leq i \leq j \leq k \leq M$, and M is a positive integer.

Correspondingly, the terminal device receives the first information block on the second time-frequency resource in the $k^{th}$ time unit based on the $j^{th}$ piece of control information.

Figure 10:
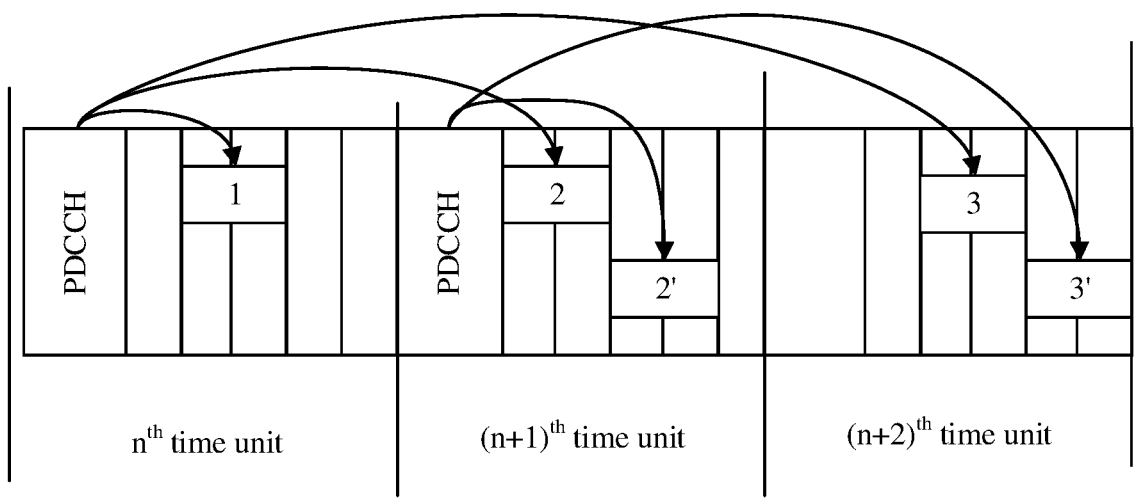
FIG. 10 is a schematic diagram of a method according to an embodiment.

As shown in FIG. 10, the network device sends two PDCCHs to the terminal device. For example, an $n^{th}$ PDCCH is located in an $n^{th}$ time unit, and the $n^{th}$ PDCCH is used to initiate transmission of the first information block on a time-frequency resource 1, a time-frequency resource 2, and a time-frequency resource 3. An $(n+1)^{th}$ PDCCH is located in an $(n+1)^{th}$ time unit, and the $(n+1)^{th}$ PDCCH is used to initiate transmission of the first information block on a time-frequency resource 2' and a time-frequency resource 3'. The time-frequency resource 2 and the time-frequency resource 2' are located in the same time unit, namely, the $(n+1)^{th}$ time unit, and the time-frequency resource 3 and the time-frequency resource 3' are located in the same time unit, namely, an $(n+2)^{th}$ time unit, where n is a positive integer.

Correspondingly, the terminal device receives the $n^{th}$ PDCCH in the $n^{th}$ time unit, and receives the first information block on the time-frequency resource 1 in the $n^{th}$ time unit based on the $n^{th}$ PDCCH, then receives the $(n+1)^{th}$ PDCCH in the $(n+1)^{th}$ time unit, and receives the first information block on the time-frequency resource 2' and the time-frequency resource 3' in the $(n+1)^{th}$ and $(n+2)^{th}$ time units based on the $(n+1)^{th}$ PDCCH.

Transmission of the first information block in each time unit corresponds to one PDCCH. Therefore, even if one or more PDCCHs are lost, it is not affected by the PDCCH which indicates the terminal device to receive corresponding data information.

Figure 11:
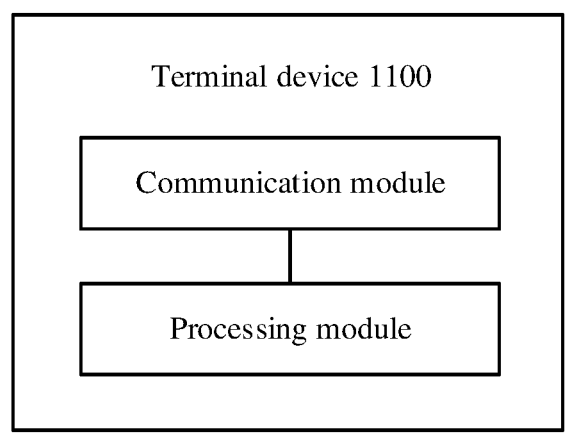
FIG. 11 is a schematic block diagram of a terminal device 1100 according to an embodiment.

FIG. 11 is a schematic block diagram of a terminal device 1100 according to an embodiment. Modules in the terminal device 1100 are configured to perform actions or processes in the foregoing method that are performed by the terminal device. Herein, to avoid repetition, for details, refer to the foregoing descriptions.

The terminal device 1100 includes a communication module and a processing module. The processing module is configured to control the communication module to receive and send signals.

The communication module is configured to receive first control information in a first time unit, where the first control information indicates a first time domain resource that is used to send a first information block. The communication module is further configured to receive the first information block on at least a part of the first time domain resource based on the first control information. The communication module is further configured to receive second control information in a second time unit, where the second control information indicates a second time domain resource that is used to send the first information block. The communication module is further configured to receive the first information block on the second time domain resource based on the second control information. The first time unit is different from the second time unit, and the first time domain resource and the second time domain resource have an overlapping time domain resource.

Optionally, the second time domain resource is a proper subset of the first time domain resource.

Optionally, the first time domain resource is a subset of the second time domain resource.

Optionally, the first information block is transmitted a total of N times, and the first control information indicates the terminal device to receive the first information block in the first time unit at an $S^{th}$ time; and/or the second control information indicates the terminal device to receive the first information block in the second time unit at an $L^{th}$ time, $1 \leq S \leq N$, $1 \leq L \leq N$, and S, L, and N are integers.

Optionally, the first control information indicates that the first information block is transmitted a total of P times; and/or the second control information indicates that the first information block is transmitted a total of Q times, $1 \leq P \leq N$, $1 \leq Q \leq N$, and P, Q, and N are integers.

It should be noted that the processing module in this embodiment may be implemented by the processor 301 in FIG. 3, and the communication module in this embodiment may be implemented by the receiver 302 and the transmitter 303 in FIG. 3.

For a technical effect that can be achieved in this embodiment, refer to the foregoing descriptions. Details are not described herein again.

Figure 12:
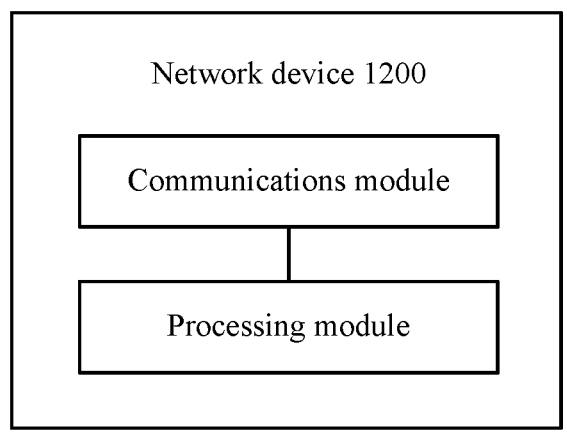
FIG. 12 is a schematic block diagram of a network device 1200 according to an embodiment.

FIG. 12 is a schematic block diagram of a network device 1200 according to an embodiment. Modules in the network device 1200 are configured to perform actions or processes in the foregoing method that are performed by the network device. Herein, to avoid repetition refer to the foregoing descriptions for details. The network device may include a communication module and a processing module. The processing module is configured to control the communication module to receive and send signals. The communication module is configured to send first control information to the terminal device in a first time unit, where the first control information indicates a first time domain resource that is used to send a first information block. The communication module is further configured to send the first information block to the terminal device on at least a part of the first time domain resource. The communication module is configured to instruct the network device to send second control information to the terminal device in a second time unit, where the second control information indicates a second time domain resource that is used to send the first information block. The communication module is configured to instruct the network device to send the second information block to the terminal device on the second time domain resource. The first time unit is different from the second time unit, and the first time domain resource and the second time domain resource have an overlapping time domain resource.

Optionally, the second time domain resource is a proper subset of the first time domain resource.

Optionally, the first time domain resource is a subset of the second time domain resource.

Optionally, the first information block is transmitted a total of N times, and the first control information indicates the terminal device to receive the first information block in the first time unit at an $S^{th}$ time; and/or the second control information indicates the terminal device to receive the first information block in the second time unit at an $L^{th}$ time, where $1 \leq S \leq N$, $1 \leq L \leq N$, and S, L, and N are integers.

Optionally, the first control information indicates that the first information block is transmitted a total of P times; and/or the second control information indicates that the first information block is transmitted a total of Q times, $1 \leq P \leq N$, $1 \leq Q \leq N$, and P, Q, and N are integers.

It should be noted that the processing module in this embodiment may be implemented by the processor 201 in FIG. 2, and the communication module in this embodiment may be implemented by the receiver 202 and the transmitter 203 in FIG. 2.

For a technical effect that can be achieved in this embodiment, refer to the foregoing descriptions. Details are not described herein again.

A person of ordinary skill in the art understands that, in combination with the examples described in the embodiments, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments.

A person of ordinary skill in the art may clearly understand that, for the purpose of convenient and brief description, for a working process of the foregoing system, apparatus, and unit, reference may be made to a corresponding process in the foregoing method embodiments. Details are not described herein again.

In the several embodiments provided, it should be understood that the disclosed system, apparatus, and method may be implemented in other manners. The described apparatus embodiment is merely an example. For example, the unit division is merely logical function division and may be other division in actual implementation. For example, a number of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a number of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a USB flash drive, removable hard disk, read-only memory (ROM), random access memory (RAM), magnetic disk, or an optical disc.

The foregoing descriptions are merely exemplary implementations, but are not intended to limit the protection scope. Any variation or replacement readily figured out by a person skilled in the art within the technical scope shall fall within the protection scope. Therefore, the protection scope shall be subject to the protection scope of the claims.

What is claimed is:

1. A data receiving method, comprising:
   receiving, by a terminal device, first control information in a first time unit, wherein the first control information indicates a first time domain resource that is used to send a first information block;
   receiving, by the terminal device, the first information block on at least a part of the first time domain resource based on the first control information;
   receiving, by the terminal device, second control information in a second time unit, wherein the second control information indicates a second time domain resource that is used to send the first information block; and
   receiving, by the terminal device, the first information block on the second time domain resource based on the second control information, wherein the first time unit is different from the second time unit, and the first time domain resource and the second time domain resource have an overlapping time domain resource.

2. The method according to claim 1, wherein the second time domain resource is a proper subset of the first time domain resource.

3. The method according to claim 1, wherein the first time domain resource is a subset of the second time domain resource.

4. The method according to claim 1, wherein the first information block is transmitted a total of N times, and the first control information indicates the terminal device to receive the first information block in the first time unit at an $S^{th}$ time; and/or
   the second control information indicates the terminal device to receive the first information block in the second time unit at an $L^{th}$ time, $1 \leq S \leq N$, $1 \leq L \leq N$, and S, L, and N are integers.

5. The method according to claim 4, wherein the first control information indicates that the first information block is transmitted a total of P times, and/or the second control information indicates that the first information block is transmitted a total of Q times, $1 \leq P \leq N$, $1 \leq Q \leq N$, and P, Q, and N are integers.

6. A data sending method, comprising:
   sending, by a network device, first control information to a terminal device in a first time unit, wherein the first control information indicates a first time domain resource that is used to send a first information block;
   sending the first information block to the terminal device on at least a part of the first time domain resource;
   sending, by the network device, second control information to the terminal device in a second time unit, wherein the second control information indicates a second time domain resource that is used to send the first information block; and
   sending, by the network device, the first information block to the terminal device on the second time domain resource, wherein
   the first time unit is different from the second time unit, and the first time domain resource and the second time domain resource have an overlapping time domain resource.

7. The method according to claim 6, wherein the second time domain resource is a proper subset of the first time domain resource.

8. The method according to claim 6, wherein the first time domain resource is a subset of the second time domain resource.

9. The method according to claim 6, wherein the first information block is transmitted a total of N times, and the first control information indicates the terminal device to receive the first information block in the first time unit at an $S^{th}$ time; and/or
   the second control information indicates the terminal device to receive the first information block in the second time unit at an $L^{th}$ time, where $1 \leq S \leq N$, $1 \leq L \leq N$, and S, L, and N are integers.

10. The method according to claim 9, wherein the first control information indicates that the first information block is transmitted a total of P times, and/or the second control information indicates that the first information block is transmitted a total of Q times, $1 \leq P \leq N$, $1 \leq Q \leq N$, and P, Q, and N are integers.

11. A data receiving apparatus, comprising:
a storage medium including executable instructions; and
a processor coupled to the storage medium, the processor executing the instructions to:
receive first control information in a first time unit, wherein the first control information indicates a first time domain resource that is used to send a first information block;
receive the first information block on at least a part of the first time domain resource based on the first control information;
receive second control information in a second time unit, wherein the second control information indicates a second time domain resource that is used to send the first information block; and
receive the first information block on the second time domain resource based on the second control information, wherein
the first time unit is different from the second time unit, and the first time domain resource and the second time domain resource have an overlapping time domain resource.

12. The apparatus according to claim 11, wherein the second time domain resource is a proper subset of the first time domain resource.

13. The apparatus according to claim 11, wherein the first time domain resource is a subset of the second time domain resource.

14. The apparatus according to claim 11, wherein the first information block is transmitted a total of N times, the first control information indicates the terminal device to receive the first information block in the first time unit at an $S^{th}$ time; and/or the second control information indicates the terminal device to receive the first information block in the second time unit at an $L^{th}$ time, $1 \leq S \leq N$, $1 \leq L \leq N$, and S, L, and N are integers.

15. The apparatus according to claim 14, wherein the first control information indicates that the first information block is transmitted a total of P times; and/or the second control information indicates that the first information block is transmitted a total of Q times, $1 \leq P \leq N$, $1 \leq Q \leq N$, and P, Q, and N are integers.

16. A data sending apparatus, comprising:
a storage medium including executable instructions; and
a processor coupled to the storage medium, the processor executing the instructions to:
send first control information to a terminal device in a first time unit, wherein the first control information indicates a first time domain resource to send a first information block;
send the first information block to the terminal device on at least a part of the first time domain resource;
send second control information to the terminal device in a second time unit, wherein the second control information indicates a second time domain resource to send the first information block; and
send the first information block to the terminal device on the second time domain resource, wherein the first time unit is different from the second time unit, and the first time domain resource and the second time domain resource have an overlapping time domain resource.

17. The apparatus according to claim 16, wherein the second time domain resource is a proper subset of the first time domain resource.

18. The apparatus according to claim 16, wherein the first time domain resource is a subset of the second time domain resource.

19. The apparatus according to claim 16, wherein the first information block is transmitted a total of N times, the first control information indicates the terminal device to receive the first information block in the first time unit at an $S^{th}$ time; and/or the second control information indicates the terminal device to receive the first information block in the second time unit at an $L^{th}$ time, $1 \leq S \leq N$, $1 \leq L \leq N$, and S, L, and N are integers.

20. The apparatus according to claim 19, wherein the first control information indicates that the first information block is transmitted a total of P times; and/or the second control information indicates that the first information block is transmitted a total of Q times, $1 \leq P \leq N$, $1 \leq Q \leq N$, and P, Q, and N are integers.

* * * * *